United States Patent
Tiirola et al.

(10) Patent No.: US 9,419,753 B2
(45) Date of Patent: Aug. 16, 2016

(54) SUPPORT OF UL ACK/NACK FEEDBACK FOR CARRIER AGGREGATION DURING TIMING UNCERTAINTY COMPONENT CARRIER (RE-) CONFIGURATION/ACTIVATION/DE-ACTIVATION PERIOD

(75) Inventors: Esa Tapani Tiirola, Kempele (FI); Kari Pekka Pajukoski, Oulu (FI); Peng Chen, Beijing (CN); Chun Yan Gao, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 320 days.

(21) Appl. No.: 13/695,083

(22) PCT Filed: Apr. 30, 2010

(86) PCT No.: PCT/CN2010/000597
§ 371 (c)(1),
(2), (4) Date: Nov. 19, 2012

(87) PCT Pub. No.: WO2011/134109
PCT Pub. Date: Nov. 3, 2011

(65) Prior Publication Data
US 2013/0064209 A1    Mar. 14, 2013

(51) Int. Cl.
*H04W 4/00* (2009.01)
*H04L 1/16* (2006.01)
(Continued)

(52) U.S. Cl.
CPC ............ *H04L 1/1692* (2013.01); *H04L 1/1607* (2013.01); *H04L 1/1825* (2013.01); *H04L 1/1829* (2013.01); *H04L 1/1861* (2013.01); *H04L 5/001* (2013.01); *H04L 5/0055* (2013.01); *H04L 1/1671* (2013.01)

(58) Field of Classification Search
USPC ................................. 370/329, 322, 328, 338
See application file for complete search history.

(56) References Cited

U.S. PATENT DOCUMENTS

| 2008/0305745 | A1 | 12/2008 | Zhang et al. | ............... 455/67.11 |
| 2009/0180561 | A1 | 7/2009 | Kim et al. | ..................... 375/260 |

(Continued)

FOREIGN PATENT DOCUMENTS

| CN | 101588224 A | 11/2009 |
| CN | 101594211 A | 12/2009 |

(Continued)

OTHER PUBLICATIONS

3GPP TS 36.213 V8.8.0 (Sep. 2009), Technical Specification, 3$^{rd}$ Generation Partnership Project; Technical Specification Group Radio Access Network; Evolved Universal Terrestrial Radio Access (E-UTRA); Physical Layer Procedures (Release 8), (77 pages).

(Continued)

*Primary Examiner* — Hicham Foud
*Assistant Examiner* — Siren Wei
(74) *Attorney, Agent, or Firm* — Harrington & Smith (57) ABSTRACT

An apparatus and a method is described, by which a component carrier configuration, re-configuration, activation or de-activation is performed. In particular, a signaling format used for acknowledgment/negative acknowledgement messages on an uplink control channel is detected, and a codebook size of the acknowledgment/negative acknowledgement messages is decided based on the detected signaling format.

19 Claims, 2 Drawing Sheets

(51) Int. Cl.
*H04L 1/18* (2006.01)
*H04L 5/00* (2006.01)

(56) References Cited

U.S. PATENT DOCUMENTS

| | | | |
|---|---|---|---|
| 2009/0225700 A1 | 9/2009 | Shen et al. | 370/328 |
| 2009/0238241 A1* | 9/2009 | Hooli | H04B 1/7143 375/133 |
| 2009/0279500 A1 | 11/2009 | Luo et al. | 370/330 |
| 2010/0074120 A1 | 3/2010 | Bergma et al. | 37/244 |
| 2010/0098012 A1 | 4/2010 | Bala et al. | 370/329 |
| 2010/0118720 A1* | 5/2010 | Gauvreau | H04W 72/048 370/252 |
| 2010/0130218 A1* | 5/2010 | Zhang | H04W 48/12 455/450 |
| 2010/0172428 A1* | 7/2010 | Pani | H04L 1/0026 375/262 |
| 2010/0271970 A1* | 10/2010 | Pan | H04L 1/0026 370/252 |
| 2010/0272048 A1* | 10/2010 | Pan | H04L 1/1635 370/329 |
| 2012/0014329 A1* | 1/2012 | Kwon | H04L 1/1607 370/328 |
| 2012/0327910 A1* | 12/2012 | Dalsgaard | H04L 5/0098 370/335 |

FOREIGN PATENT DOCUMENTS

| | | |
|---|---|---|
| CN | 101662833 A | 3/2010 |
| JP | 2013520105 A | 5/2013 |
| JP | 2013531901 A | 8/2013 |
| RU | 2376710 C2 | 12/2009 |
| TW | 200952380 A | 12/2009 |
| WO | WO-2009023850 A1 | 2/2009 |
| WO | WO 2010/048142 A1 | 4/2010 |
| WO | WO-2011/041623 A1 | 4/2011 |
| WO | WO-2011140002 A1 | 11/2011 |

OTHER PUBLICATIONS

R1-100845, 3GPP TSG-RAN WG1 #60, San Francisco, USA, Feb. 22-26, 2010, "On PUCCH Resource Allocation for Carrier Aggregation", Ericsson, ST-Ericsson, 3 pgs.
R1-101253, 3GPP TSG-RAN WG1 #60, San Francisco, USA, Feb. 22-26, 2010, "Support of UL ACK/NACK channel selection for carrier aggregation", Panasonic, 6 pgs.
Ericsson et al: "On ACK/NACK codebook performance for carrier aggregation"; R1-101787; 3GPP TSG-RAN WG1 #60bis, Beijing, China, Apr. 12-16, 2014; pp. 1-19; 3rd Generation Partnership Project (3GPP); Mobile Competence Centre; 650, Route des Lucioles; F-06921 Sophia-Antipolis Cedex; France.
ZTE: "Methods for ACK/NACK multiplexing" R1-101815; 3GPP TSG-RAN WG1 Meeting #60bis, Beijing, China, Apr. 12-16, 2010; pp. 1-5; 3rd Generation Partnership Project (3GPP); Mobile Competence Centre; 650, Route des Lucioles; F-06921 Sophia-Antipolis Cedex; France.
Nokia Siemens Networks et al: "On PUCCH Resource allocation for CA"; R1-101885; 3GPP TSG RAN WG1 Meeting #60bis, Beijing, P.R. China, Apr. 12-16, 2010; pp. 1-3; 3rd Generation Partnership Project (3GPP); Mobile Competence Centre; 650, Route des Lucioles; F-06921 Sophia-Antipolis Cedex; France.
"UL ACK/NACK design for carrier aggregation—payload and format", Huawei, 3GPP TSG RAN WG1 Meeting #60bis, R1-101942, Apr. 12-16, 2010, 5 pgs.
"PUCCH ACK/NAK multiplexing and resource allocation for carrier aggregation", ETRI, 3G TSG RAN WG1 Meeting #60bis, R1-102244, Apr. 12-16, 2010, 4 pgs.
"On simultaneous PUSCH and PUCCH and clustered SC-FDMA", Nokia Siemens Networks, 3G TSG RAN WG1 Meeting #60bis, R1-101876, Apr. 12-16, 2010, 6 pgs.
"Support of UL ACK/NACK channel selection for carrier aggregation", Panasonic, 3GPP TSG RAN WG1 Meeting #60bis, R1-102022, Apr. 12-16, 2010, 6 pgs.
"3$^{rd}$ Generation Partnership Project; Technical Specification Group radio Access Network; Evolved Universal Terrestrial Radio Access (E-UTRA); Physical layer procedures (Release 9)", 3GP TS 36.213 V9.1.0, Mar. 2010, 79 pgs.
Huawei: "UL ACK/NACK feedback related Dci design for carrier aggregation"; R1-101943; 3GPP Draft; 3rd Generation Partnership Project (3GPP); Mobile Competence Centre; 650, Route des Lucioles; F-06921 Sophia-Antipolis Cedex; France; vol. RAN WG1, no. Beijing, China; Apr. 12, 2010, Apr. 6, 2010, XP050419287, [retrieved on Apr. 6, 2010] p. 1-p. 4.

* cited by examiner

SUPPORT OF UL ACK/NACK FEEDBACK FOR CARRIER AGGREGATION DURING TIMING UNCERTAINTY COMPONENT CARRIER (RE-) CONFIGURATION/ACTIVATION/DE-ACTIVATION PERIOD

FIELD OF THE INVENTION

The present invention relates to an apparatus, method and computer program product for providing support of UL ACK/NACK feedback for carrier aggregation during a timing uncertainty component carrier (re-)configuration/activation/de-activation period.

RELATED BACKGROUND ART

The following meanings for the abbreviations used in this specification apply:
3GPP 3rd generation partnership project
ACK Acknowledgement
BW Bandwidth
CA Carrier Aggregation
CC Component carrier
DL Downlink
eNB Enhanced Node B, name for Node B in LTE
FB Feedback
FDD Frequency Division Duplex
LTE Long term evolution
LTE-A LTE-Advanced
MAC Media Access Control
MIMO Multiple Input Multiple Output
NAK Negative Acknowledgement
PDCCH Physical Downlink Control Channel
PUCCH Physical Uplink Control Channel
PUSCH Physical Uplink Shared Channel
RRC Radio Resource Control
SU-MIMO Single User Multiple Input Multiple Output
TDD Time Division Duplex
UE User equipment
UL Uplink Embodiments of the present invention relate to LTE-Advanced system, which will be part of 3GPP LTE Rel-10. More specifically, some embodiments are focussed on UL ACK/NAK feedback design for component carrier (CC) aggregation to deal with the issues related to timing uncertainty CC re-configuration period.

In the following, carrier aggregation (CA) in LTE-Advanced is described in some more detail. In particular, 3GPP is currently studying a new system called LTE-Advanced which fulfils the IMT-Advanced requirements set by the ITU-R. Topics include e.g. bandwidth extensions beyond 20 MHz, relays, MIMO (multiple input multiple output) enhancements such as advanced multi-user MIMO (MU-MIMO) and introduction of SU-MIMO in uplink.

The bandwidth extension beyond 20 MHz in LTE-Advanced has been decided to be done via component carrier aggregation (CA), in which several Release 8 compatible carriers are aggregated together to form a larger bandwidth.

Figure 3:
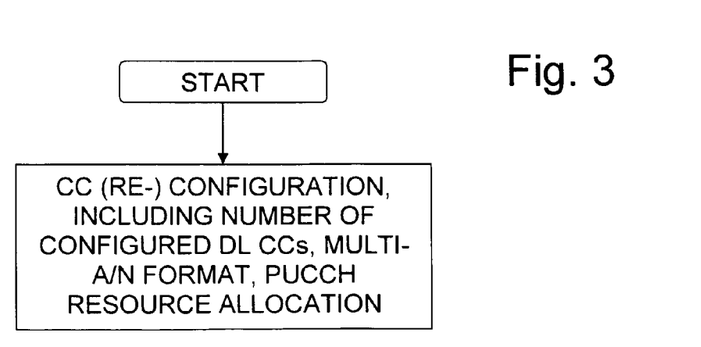
FIG. 3 shows an example of carrier aggregation.

FIG. 3 shows an example for carrier aggregation, in which five carriers (carrier 1 to carrier 5), each corresponding to a Release 8 bandwidth (BW), can be aggregated to form the maximum bandwidth for LTE-Advanced (100 MHz).

The idea is that each Rel'8 terminal can receive/transmit on one of the CCs, whereas LTE-Advanced terminals supporting CA can receive/transmit on multiple CCs at the same time, thus having support for large bandwidth. It has been agreed that up to 5 CCs could be aggregated in LTE-Advanced in both FDD and TDD systems (Rel-10). This number can be increased in coming releases.

In the case eNB wants to enable transmission/reception via multiple DL CCs for a certain UE, it needs to configure the corresponding CCs via radio resource control (RRC) signaling (→configured but de-activated component carriers). In addition to RRC-level CC-configuration it has been agreed to support MAC-level CC activation/deactivation mechanism in LTE-Advanced. An UE needs to be prepared to receive PDCCH and PDSCH (and transmit PUSCH) via activated component carriers. For deactivated CC(s), UE is prepared to receive neither PDCCH nor PDSCH.

In the following, uplink acknowledgement/negative acknowledgement (UL ACK/NAK) feedback for carrier aggregation is described.

For carrier aggregation, it has been agreed that:
Independent transport block is sent via each CC
One ACK/NAK for each transport block is supported.

Based on above agreements, multiple ACK/NAKs will be sent during one UL subframe. Furthermore, in typical configuration there is asymmetry between the number of DL and UL component carrier supported by the UE. This needs to be taken into account in the ACK/NAK feedback design as well.

To support UL ACK/NAK feedback for CA, the following methods are considered to be promising:
Channel selection (e.g., as defined in TS 36.213) to support up to 4 bits on PUCCH format 1b.
ACK/NAK multiplexing method to support more than 4 bits on PUCCH format 2/2a/2b or other new structure (e.g. multi-sequence modulation).

Channel selection is a mature method to support up to 4 bits, which is used to support the asymmetry of the UL/DL subframe configuration in Rel'8 TDD. Hence, it is natural to support channel selection in carrier aggregation case as well (limited feedback (FB), up-to four bits). For the case with more than 4 ACK/NAK bits, PUCCH format 2 or some other physical channel needs to be considered. It is also possible to extend channel selection to support more than 4 bits.

In the case of CA, the number of ACK/NAK bits that need to be sent during one UL subframe depends on the number of configured DL CCs (this signaled via RRC signaling) or activated DL CCs (signaled via MAC signaling). However, it is noted that there will be a time period when the eNB cannot be sure about the existing number of DL CCs configured and/or activated by the UE. Such misalignment may happen due to UE processing delays related to RRC signaling. Another source of misalignment is potential signaling errors (PDCCH, ACK, NAK) related to activation/deactivation commands. It is noted that during such uncertainty period the existing UL ACK/NAK signaling methods will face severe problems because of the ambiguity on the ACK/NAK codebook size between eNB and UE. These problems include severe scheduler restrictions and also a very high probability for higher layer errors.

Therefore new mechanisms are needed to support reliable ACK/NAK feedback in all cases.

For related design to support UL ACK/NAK feedback for CA during uncertainty higher layer signaling period, in the following, the existing mechanism is described:

For channel selection on PUCCH format 1b, the channel selection table depends on the number of configured/activated DL CCs, and UE will select one PUCCH resource and QPSK point for transmission based on ACK/NAK status. However, in case the ambiguity about the number of configured/activated DL CCs exists, eNB will have no idea which channel selection table is adopted at UE side. In such case, eNB can not be sure about the ACK/NAK status based on the detected PUCCH resource and QPSK constellation point.

For ACK/NAK multiplexing on PUCCH format 2, similar ambiguity exists if the number of ACK/NAK feedback depends on the configured or activated DL CCs.

So, existing mechanism could not handle such an issue.

SUMMARY OF THE INVENTION

Thus, it is an object of the present invention to overcome the above problems of the prior art.

According to several embodiments of the present invention, an apparatus and a method are provided by which a component carrier configuration, re-configuration, activation or de-activation is performed, wherein a signaling format used for acknowledgment/negative acknowledgement messages on an uplink control channel is detected, and a codebook size of the acknowledgment/negative acknowledgement messages is decided based on the detected signaling format.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

As described in the introductory part, some embodiments aim to provide new mechanisms for supporting reliable ACK/NAK feedback in all cases.

In particular, according to embodiments, an arrangement is described which is capable to solve timing uncertainty related to ACK/NAK signaling during the component carrier re-configuration. According to more concrete examples, the arrangement contains the following parts:

UE/eNB procedure to convey multi-ACK/NAK in the UL (standard-related)

Signalling solution to implement the proposed arrangement (standard-related)

eNB procedures to avoid potential error cases (implementation-related)

It is assumed that at least two multi-ACK/NAK signaling formats are applicable to convey ACK/NAK feedback corresponding to multiple DL CCs on the uplink (PUCCH and PUSCH)

one is designed for limited ACK/NAK feedback and based on PUCCH format 1b and channel selection another is designed for full ACK/NAK feedback and based on joint coding on top of PUCCH Format 2, PUSCH or some other channel type.

According to the scheme according to embodiments, the ACK/NAK codebook size depends on the signaling format used to convey ACK/NAK feedback on the PUCCH:

ACK/NAK codebook size (i.e., channel selection table) is based on the maximum number of DL CCs in the case when PUCCH channel selection is applied on the PUCCH ACK/NAK codebook size is based on the number of configured (or activated) DL CCs in the case when PUCCH channel selection is not applied.

Figure 1:
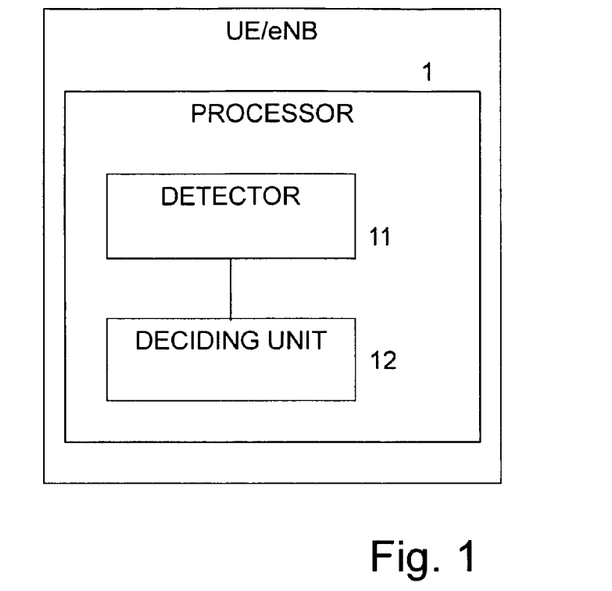
FIG. 1 shows a structure of an apparatus, e.g. a user equipment (UE) or an eNB according to some embodiments of the present invention.

In the following, a more general embodiment applying the above scheme is described by referring to FIG. 1:

FIG. 1 shows an apparatus according to a general embodiment of the invention. This apparatus may be an eNB, a UE, or a part of an eNB or a UE, for example.

In particular, the apparatus comprises a processor (1) configured to perform a component carrier configuration, re-configuration, activation or de-activation. The processor comprises a detector 11 configured to detect a signaling format used for acknowledgment/negative acknowledgement messages on an uplink control channel (e.g., PUCCH), and a deciding unit 12 configured to decide a codebook size of the acknowledgment/negative acknowledgement messages based on the detected signaling format.

It is noted that the processor 1 can be part of a central processor of an eNB or an UE, and/or can be configured to carry out further functions. Moreover, the detector and the deciding unit can be implemented by software carried out by the processor, for example.

In the following, a method according to a general embodiment of the invention is described. Similar as described above, the method may be carried out by an eNB, a UE, or a part of an eNB or a UE, for example.

In particular, in the method, a component carrier configuration, re-configuration, activation or de-activation is performed, wherein the performing further comprises detecting a signaling format used for acknowledgment/negative acknowledgement messages on an uplink control channel (e.g., PUCCH), and deciding a codebook size of the acknowledgment/negative acknowledgement messages based on the detected signaling format.

Hence, in this way the ACK/NAK codebook size is decided based on the signalling format used to convey ACK/NAK feedback on an uplink control signal such as a PUCCH.

Thus, according to embodiments of the present invention, a solution is provided by which acknowledge/non-acknowledge (ACK/NAK) feedback error cases due to different component carrier (CC) configuration/activation between, e.g., UE and eNB are avoided.

The decided ACK/NAK codebook size may be applied in at least one of the following cases: when signaling ACK/NAK on PUCCH, when signaling ACK/NAK on PUSCH, or when signaling ACK/NAK on PUCCH and PUSCH.

As described above, ACK/NAK codebook size is based on maximum number of DL CCs (in the following also referred to as M) in the case of PUCCH channel selection. In the following, this maximum number of DL CCs is described in more detail.

There are few options to define the maximum number of DL CCs:

1. M is based on the UE category, i.e., how many DL CCs are supported by the UE

2. M is a value pre-defined in the specification. One approach is to define M based on the maximum number of DL CCs supported by the channel selection (e.g., M=4)

3. M can be a semi-statically configured parameter defined by the eNB (in UE-specific manner or in cell-specific manner).

After CC (re-)configuration/activation/de-activation the UE starts using pre-defined PUCCH channel selection table according to M. It is noted that the eNB can improve the detection performance of PUCCH channel selection by ignoring the states corresponding to non-activated CCs (i.e., it is known in advance that those CCs are in DTX state in any case).

In the following, the PUCCH resource allocation for PUCCH channel selection is described. In particular, there is no need to reserve PUCCH resources according to maximum number of configured/activated CCs. Instead, according to the present embodiment PUCCH Format 1a/1b resources are reserved using one of the following methods:
1. Implicit resource allocation based on number of scheduled CCs
2. Explicit resource allocation based on number of configured CCs
3. Hybrid resource allocation in which PUCCH resources corresponding to DL CCs scheduled via primary DL CC are reserved implicitly whereas PUCCH resources corresponding to DL CCs scheduled via secondary DL CC(s) are reserved explicitly.

According to the present embodiment, PUCCH resources other than those reserved using implicit RA are signaled as part of CC (re-)configuration/activation/de-activation.

In the following, procedures to avoid ACK/NAK error cases due to CC (re-)configuration are described:

There are various cases which may result in error case for multi-A/N signaling:
1. Number of DL CCs can change (→payload of multi-ACK/NAK varies accordingly). This is not a problem with PUCCH channel selection following the scheme according to the embodiment described above.
2. Multi-ACK/NAK format can change (PUCCH channel selection←→joint coding).
3. Both can change at the same time In the following, three alternative procedures are described, by which the above problems 2 and 3 can also be overcome.

According to a first procedure, which is implementation related, the eNB changes the multi-ACK/NAK PUCCH resource in case CC (re-)configuration (or in activation/deactivation if applicable). This allows performing blind detection at the eNB side to decide which PUCCH resource is applied at UE side (old resource or new resource). The first procedure is applicable in particular for joint coding, more specifically when signaling multi-A/N on PUCCH. However, the first procedure may also be applied for channel selection, although this would not be necessary when applying the scheme according to the embodiment described above.

According to a second procedure, which is also implementation related, the eNB avoids concurrent transmission of PUSCH and multi-ACK/NAK using scheduler restrictions. This allows eNB to apply the first procedure described above. The second procedure is applicable to both cases, i.e., joint coding and channel selection.

In the following, a third procedure is described, which is standard-related: It is possible to include data-associated control signaling in multi-ACK/NAK FB to signal the status of CC re-configuration/activation/de-activation. One approach is to include this information in RS modulation (PUCCH format 2a/2b). Another approach is to signal the codebook size as part of multi-ACK/NAK message. This scheme is applicable in both PUCCH and PUSCH.

The third procedure is applicable in particular to joint coding. However, in the case ACK/NAK is multiplexed with UL data, then also the third procedure can be applied for both schemes, i.e., joint coding and channel selection.

In the following, examples for technical implementations are described.

Figure 2:
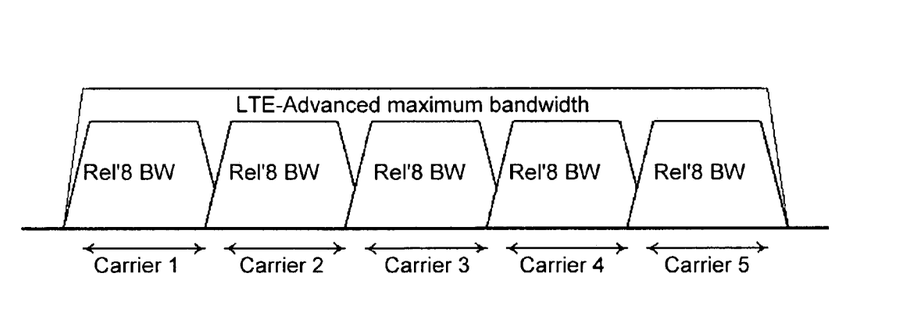
FIG. 2 shows a process according to some embodiments of the present invention.

The principle of the UE/eNB procedure is shown in FIG. 2. It assumes that RRC-level CC (re-)configuration is used to configure the number of DL CCs, multi-ACK/NAK format and PUCCH resource allocation.

According to FIG. 2, the following information may be potentially signaled accompanied with RRC CC (re-)configuration, as indicated in step S1:
1. Number of configured DL CCs (and also configured CC index).
2. PUCCH ACK/NAK container format (i.e. channel selection on PUCCH format 1b, or joint coding on PUCCH format 2/2a/2b, or other channel type).
3. Explicit resource allocation for multi ACK/NAK resource (per DL CC for PUCCH channel selection)

It is noted that in FIG. 2, the PUCCH ACK/NAK container format or multi ACK/NAK format is abbreviated as A/N format.

In step S2, it is detected which kind of multi-A/N format is used.

In case channel selection on PUCCH format 1b is used to convey multi-ACK/NAK, the ACK/NAK codebook size (i.e. channel selection table) depends on maximum number of DL CCs (as shown in step S2). It is noted that the defined codebook can be applied only in the case when signalling ACK/NAK on PUCCH. The other choice is to apply the selected codebook size also when multiplexing ACK/NAK with PUSCH data.

In case joint coding on PUCCH format 2/2a/2b, or PUSCH, or other channel type is used to convey multi-ACK/NAK, the ACK/NAK codebook size depends on the number of configured DL CCs (as shown in step S3). Again, it is possible to apply the defined codebook size only in the case when signaling ACK/NAK on PUCCH. The other choice is to apply the selected codebook size also when multiplexing ACK/NAK with PUSCH data.

Furthermore the first to third procedures described above can be used to handle potential ambiguity/error case.

After performing step S3 or step S4, the new CC configuration is taken into use (at the UE).

It is noted that step S2 corresponds to the detecting of a signaling format as described in the method according to the more general embodiment, and steps S3 and S4 correspond to deciding a codebook size as described in the method according to the more general embodiment.

Furthermore, the following implementations are available for PUCCH channel selection:

Implementation 1: for one UE, if the possible maximum number of configured/activated DL CCs is not bigger than 4, channel selection table as defined in Table 10.1-4 (TS36.213 v8.8.0) is utilized at UE side for channel selection, no matter how many DL CCs are really configured/activated.

Implementation 2: for one UE, if the possible maximum number of configured/activated DL CCs is not bigger than 4, a unified channel selection table is defined at UE side for channel selection, no matter how many DL CCs are really configured/activated. A unified channel selection table is a single channel selection table applicable to all channel selection cases.

Implementation 3: for one UE, if the possible maximum number of configured/activated DL CCs is 5 and UE detects one pre-defined DL CC is not scheduled, UE will perform channel selection (with unified channel selection table) on PUCCH format 1b. Otherwise, UE will perform ACK/NAK multiplexing on PUCCH format 2/2a/2b. For such an implementation, eNB performs blind detection to distinguish which container is utilized at UE side.

Implementation 4: for ACK/NAK multiplexing on PUCCH format 2/2a/2b or other new structure, one bit is sent via RS modulation. In case ACK/NAK codebook size is changed, the bit will be toggled. Otherwise, the bit will not be changed. In such a way, eNB could know exactly which ACK/NAK codebook size is utilized at UE side.

Thus, by the embodiments described above, the following advantages are achieved:

The proposed scheme is capable to handle all the error cases related to ACK/NAK codebook ambiguity during CC re-configuration/activation/deactivation. Also, the PUCCH resource consumption can be minimized with PUCCH channel selection. Embodiments can support for flexible scheduling during CC (re-)configuration. Furthermore, standardization effort is small.

Generally, the solutions described above are simple and efficient without permanent losses on signalling efficiency.

It is noted that some embodiments as described above are directed to LTE-A. However, LTE-A is only an example, and embodiments of the present invention may be applied on any radio access technology in which a system bandwidth is divided in sub-bands and component carriers are used, and acknowledgement/negative acknowledgement messages are to be sent which may vary in size.

According to a first aspect of several embodiments of the invention, an apparatus is provided which comprises
  a processor configured to perform a component carrier configuration, re-configuration, activation or de-activation, the processor comprising
  a detector configured to detect a signaling format used for acknowledgment/negative acknowledgement messages on an uplink control channel, and
  a deciding unit configured to decide a codebook size of the acknowledgment/negative acknowledgement messages based on the detected signaling format.

The first aspect may be modified as follows:

The deciding unit may be configured to decide the codebook size based on the maximum number of downlink component carriers incase as a signaling format for the acknowledgment/negative acknowledgement messages on the uplink control channel a channel selection is applied.

The maximum number of downlink component carriers
  may be defined based on how many downlink component carriers are supported by a network element,
  may be a predefined value,
  may be defined based on a maximum number of downlink component carriers supported by the channel selection, or
  may be a semi-statically configured parameter defined by a network control element.

The deciding unit may be configured to decide the codebook size based on the number of configured or activated downlink component carriers in case as a signaling format for the acknowledgment/negative acknowledgement messages on the uplink control channel a channel selection is not applied. For example, in this case joint coding may be applied.

The processor may be configured to use a predefined uplink control channel selection table according to the maximum number of downlink component carriers.

The processor may be configured
  to reserve uplink control channel resources based on a number of scheduled component carriers or a number of configured component carriers, and/or
  to reserve uplink control channel resources corresponding to downlink component carriers scheduled via a primary downlink component carrier based on the number, of scheduled component carriers, and to reserve uplink control channel resources corresponding to downlink component carriers scheduled via secondary downlink control channels based on the number of configured component carriers.

The processor may be configured to change an uplink control channel resource for multiple acknowledgment/negative acknowledgement messages on performing a component carrier configuration, re-configuration, activation or de-activation.

The processor may be configured to avoid concurrent transmission of a PUSCH and multiple acknowledgment/negative acknowledgement Messages at predetermined time periods with time uncertainty related to component carrier configuration.

The processor may be configured to include data-associated control signaling in a multiple acknowledgment/negative acknowledgement message for signaling the status of a component carrier configuration, re-configuration, activation or de-activation.

The processor may be configured to use a unified channel selection table in case a possible maximum number of configured and/or activated downlink component carriers is not bigger than a predetermined number.

The processor may be configured to apply the decided codebook size of the acknowledgment/negative acknowledgement messages in at least one of the following cases:
  when signaling acknowledgment/negative acknowledgement messages on an uplink control channel,
  when signaling acknowledgment/negative acknowledgement messages on an uplink shared channel, and/or
  when signaling acknowledgment/negative acknowledgement messages on an uplink control channel and an uplink shared channel.

The apparatus may be a user equipment or may be part of a user equipment, or may be a network control element such as an eNB, or may be a part thereof.

According to a second aspect of several embodiments of the invention, a method is provided which comprises
  performing a component carrier configuration, re-configuration, activation or de-activation, the performing further comprising
  detecting a signaling format used for acknowledgment/negative acknowledgement messages on an uplink control channel, and
  deciding a codebook size of the acknowledgment/negative acknowledgement messages based on the detected signaling format.

The performing, detecting and deciding may be performed by a processor or a similar processing means, for example.

The second aspect may be modified as follows:

In case as a signaling format for the acknowledgment/negative acknowledgement messages on the uplink control channel a channel selection is applied, the codebook size may be decided based on the maximum number of downlink component carriers.

The maximum number of downlink component carriers
  may be defined based on how many downlink component carriers are supported by a network element,
  may be a predefined value, may be defined based on a maximum number of downlink component carriers supported by the channel selection, or may be a semi-statically configured parameter defined by a network control element.

In case as a signaling format for the acknowledgment/negative acknowledgement messages on the uplink control channel a channel selection is not applied, the codebook size may be decided based on the number of configured or activated downlink component carriers.

The method may further comprise
using a predefined uplink control channel selection table according to the maximum number of downlink component carriers.

The method may further comprise
reserving uplink control channel resources based on a number of scheduled component carriers or a number of configured component carriers, and/or
reserving uplink control channel resources corresponding to downlink component carriers scheduled via a primary downlink component carrier based on the number of scheduled component carriers, and reserving uplink control channel resources corresponding to downlink component carriers scheduled via secondary downlink control channels based on the number of configured component carriers.

The method may further comprise
changing an uplink control channel resource for multiple acknowledgment/negative acknowledgement messages on performing a component carrier configuration, re-configuration, activation or de-activation.

The method may further comprise avoiding concurrent transmission of a PUSCH and multiple acknowledgment/negative acknowledgement messages at predetermined time periods with time uncertainty related to component carrier configuration.

The method may further comprise including data-associated control signaling in a multiple acknowledgment/negative acknowledgement message for signaling the status of a component carrier configuration, re-configuration, activation or de-activation.

The method may further comprise using a unified channel selection table in case a possible maximum number of configured and/or activated downlink component carriers is not bigger than a predetermined number.

The decided codebook size of the acknowledgment/negative acknowledgement messages may be applied in at least one of the following cases:
when signaling acknowledgment/negative acknowledgement messages on an uplink control channel,
when signaling acknowledgment/negative acknowledgement messages on an uplink shared channel, and/or
when signaling acknowledgment/negative acknowledgement messages on an uplink control channel and an uplink shared channel.

According to a third aspect of several embodiments of the present invention, a computer program product is provided which comprises code means for performing a method according to any one of the second aspect and its modifications when run on a computer.

The computer program product is embodied on a computer-readable medium.

The computer program product may be directly loadable into an internal memory of the computer.

According to a fourth aspect of several embodiments of the invention, an apparatus is provided which comprises means for performing a component carrier configuration, re-configuration, activation or de-activation,
means for detecting a signaling format used for acknowledgment/negative acknowledgement messages on an uplink control channel, and
means for a deciding a codebook size of the acknowledgment/negative acknowledgement messages based on the detected signaling format.

The fourth aspect may be modified as follows:
The apparatus may further comprise means for deciding the codebook size based on the maximum number of downlink component carriers in case as a signaling format for the acknowledgment/negative acknowledgement messages on the uplink control channel a channel selection is applied.

The maximum number of downlink component carriers
may be defined based on how many downlink component carriers are supported by a network element,
may be a predefined value,
may be defined based on a maximum number of downlink component carriers supported by the channel selection, or
may be a semi-statically configured parameter defined by a network control element.

The apparatus may further comprise means for deciding codebook size based on the number of configured or activated downlink component carriers in case as a signaling format for the acknowledgment/negative acknowledgement messages on the uplink control channel a channel selection is not applied. For example, in this case joint coding may be applied.

The apparatus may further comprise means for using a predefined uplink control channel selection table according to the maximum number of downlink component carriers.

The apparatus may further comprise means for
reserving uplink control channel resources based on a number of scheduled component carriers or a number of configured component carriers, and/or
reserving uplink control channel resources corresponding to downlink component carriers scheduled via a primary downlink component carrier based on the number of scheduled component carriers, and reserving uplink control channel resources corresponding to downlink component carriers scheduled via secondary downlink control channels based on the number of configured component carriers.

The apparatus may further comprise means for changing an uplink control channel resource for multiple acknowledgment/negative acknowledgement messages on performing a component carrier configuration, re-configuration, activation or de-activation.

The apparatus may further comprise means for avoiding concurrent transmission of a PUSCH and multiple acknowledgment/negative acknowledgement messages at predetermined time periods with time uncertainty related to component carrier configuration.

The apparatus may further comprise means for including data-associated control signaling in a multiple acknowledgment/negative acknowledgement message for signaling the status of a component carrier configuration, re-configuration, activation or de-activation.

The apparatus may further comprise means for using a unified channel selection table in case a possible maximum number of configured and/or activated downlink component carriers is not bigger than a predetermined number.

The apparatus may further comprise means for applying the decided codebook size of the acknowledgment/negative acknowledgement messages in at least one of the following cases:

when signaling acknowledgment/negative acknowledgement messages on an uplink control channel, when signaling acknowledgment/negative acknowledgement messages on an uplink shared channel, and/or when signaling acknowledgment/negative acknowledgement messages on an uplink control channel and an uplink shared channel.

The apparatus may be a user equipment or may be part of a user equipment, or may be a network control element such as an eNB, or may be a part thereof.

It is to be understood that any of the above modifications can be applied singly or in combination to the respective aspects and/or embodiments to which they refer, unless they are explicitly stated as excluding alternatives.

For the purpose of the present invention as described herein above, it should be noted that method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, UE, eNB etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising:
   at least one processor configured to perform a component carrier configuration, reconfiguration, activation or de-activation; and
   at least one memory including computer program code, said at least one memory and the computer program code configured, with the at least one processor, to cause the apparatus to perform the following:
   detect a signaling format used for acknowledgment/negative acknowledgement messages on an uplink control channel; and
   decide a codebook size of the acknowledgment/negative acknowledgement messages based on whether the detected signaling format is one based on PUCCH format 1b and channel selection, or another based on joint coding on top of PUCCH format 2 or PUSCH,
   wherein the codebook size is decided based on the maximum number of downlink component carriers when a channel selection is applied, and
   wherein the maximum number of downlink component carriers is defined based on a maximum number of downlink component carriers supported by the channel selection.

2. The apparatus according to claim 1, wherein said at least one memory and the computer program code are further configured, with the at least one processor, to cause the apparatus to decide the codebook size based on the number of configured or activated downlink component carriers when a channel selection is not applied.

3. The apparatus according to claim 1, wherein said at least one memory and the computer program code are further configured, with the at least one processor, to cause the apparatus to use a predefined uplink control channel selection table according to the maximum number of downlink component carriers.

4. The apparatus according to claim 1, wherein the processor is configured:
   to reserve uplink control channel resources based on a number of scheduled component carriers or a number of configured component carriers, and/or
   to reserve uplink control channel resources corresponding to downlink component carriers scheduled via a primary downlink component carrier based on the number of scheduled component carriers, and to reserve uplink control channel resources corresponding to downlink component carriers scheduled via secondary downlink control channels based on the number of configured component carriers.

5. The apparatus according to claim 1, wherein said at least one memory and the computer program code are further configured, with the at least one processor, to cause the apparatus to change an uplink control channel resource for multiple acknowledgment/negative acknowledgement messages on performing a component carrier configuration, re-configuration, activation or de-activation.

6. The apparatus according to claim 1, wherein said at least one memory and the computer program code are further configured, with the at least one processor, to cause the apparatus to avoid concurrent transmission of a PUSCH and multiple acknowledgment/negative acknowledgement messages at predetermined time periods with time uncertainty related to component carrier configuration.

7. The apparatus according to claim 1, wherein said at least one memory and the computer program code are further configured, with the at least one processor, to cause the apparatus to include data-associated control signaling in a multiple acknowledgment/negative acknowledgement message for signaling the status of a component carrier configuration, re-configuration, activation or de-activation.

8. The apparatus according to claim 1, wherein said at least one memory and the computer program code are further configured, with the at least one processor, to cause the apparatus to use a unified channel selection table in case a possible maximum number of configured and/or activated downlink component carriers is not bigger than a predetermined number.

9. The apparatus according to claim 1, wherein said at least one memory and the computer program code are further configured, with the at least one processor, to cause the apparatus to apply the decided codebook size of the acknowledgment/negative acknowledgement messages in at least one of the following cases:
   when signaling acknowledgment/negative acknowledgement messages on an uplink control channel,
   when signaling acknowledgment/negative acknowledgement messages on an uplink shared channel, and
   when signaling acknowledgment/negative acknowledgement messages on an uplink control channel and an uplink shared channel.

10. A method comprising:
   detecting a signaling format used for acknowledgment/negative acknowledgement messages on an uplink control channel; and
   deciding a codebook size of the acknowledgment/negative acknowledgement messages based on whether the detected signaling format is one based on PUCCH format 1b and channel selection, or another based on joint coding on top of PUCCH format 2 or PUSCH,
   wherein the method is for performing a component carrier configuration, reconfiguration, activation or de-activation,
   wherein the codebook size is decided based on the maximum number of downlink component carriers when a channel selection is applied, and
   wherein the maximum number of downlink component carriers is defined based on a maximum number of downlink component carriers supported by the channel selection.

11. The method according to claim 10, wherein, when a channel selection is not applied, the codebook size is decided based on the number of configured or activated downlink component carriers.

12. The method according to claim 10, further comprising:
   using a predefined uplink control channel selection table according to the maximum number of downlink component carriers.

13. The method according to claim 10, further comprising:
   reserving uplink control channel resources based on a number of scheduled component carriers or a number of configured component carriers, and/or
   reserving uplink control channel resources corresponding to downlink component carriers scheduled via a primary downlink component carrier based on the number of scheduled component carriers, and reserving uplink control channel resources corresponding to downlink component carriers scheduled via secondary downlink control channels based on the number of configured component carriers.

14. The method according to claim 10, further comprising:
   changing an uplink control channel resource for multiple acknowledgment/negative acknowledgement messages on performing a component carrier configuration, re-configuration, activation or de-activation.

15. The method according to claim 10, further comprising:
   avoiding concurrent transmission of a PUSCH and multiple acknowledgment/negative acknowledgement messages at predetermined time periods with time uncertainty related to component carrier configuration.

16. The method according to claim 10, further comprising:
   including data-associated control signaling in a multiple acknowledgment/negative acknowledgement message for signaling the status of a component carrier configuration, re-configuration, activation or de-activation.

17. The method according to claim 10, further comprising:
   using a unified channel selection table in case a possible maximum number of configured and/or activated downlink component carriers is not bigger than a predetermined number.

18. The method according to claim 10, wherein the decided codebook size of the acknowledgment/negative acknowledgement messages is applied in at least one of the following cases:
   when signaling acknowledgment/negative acknowledgement messages on an uplink control channel,
   when signaling acknowledgment/negative acknowledgement messages on an uplink shared channel, and
   when signaling acknowledgment/negative acknowledgement messages on an uplink control channel and an uplink shared channel.

19. A computer program product comprising a non-transitory computer-readable storage medium bearing computer program code embodied therein for use with a computer, the computer program code comprising code for performing a method including:
   detecting a signaling format used for acknowledgment/negative acknowledgement messages on an uplink control channel; and
   deciding a codebook size of the acknowledgment/negative acknowledgement messages based on whether the detected signaling format is one based on PUCCH format 1b and channel selection, or another based on joint coding on top of PUCCH format 2 or PUSCH,
   wherein the method is for performing a component carrier configuration, reconfiguration, activation or de-activation,
   wherein the codebook size is decided based on the maximum number of downlink component carriers when a channel selection is applied, and
   wherein the maximum number of downlink component carriers is defined based on a maximum number of downlink component carriers supported by the channel selection.

* * * * *